United States Patent
Lewis et al.

(10) Patent No.: US 12,485,578 B2
(45) Date of Patent: Dec. 2, 2025

(54) METHOD FOR MANUFACTURING A TILE PRODUCT

(71) Applicant: Benelux Applied Surfaces, LLC, Archbald, PA (US)

(72) Inventors: David W. Lewis, Shavertown, PA (US); Nathan J. Keisling, Dalton, PA (US); Victoria M. Frosini, Dalton, PA (US)

(73) Assignee: Benelux Applied Surfaces, LLC, Archbald, PA (US)

( * ) Notice: Subject to any disclaimer, the term of this patent is extended or adjusted under 35 U.S.C. 154(b) by 0 days.

(21) Appl. No.: 18/830,133

(22) Filed: Sep. 10, 2024

(65) Prior Publication Data

US 2025/0345968 A1 Nov. 13, 2025

Related U.S. Application Data

(60) Provisional application No. 63/644,902, filed on May 9, 2024.

(51) Int. Cl.
*B28B 19/00* (2006.01)
*B28B 1/087* (2006.01)
*B32B 13/04* (2006.01)

(52) U.S. Cl.
CPC .......... *B28B 19/0053* (2013.01); *B28B 1/087* (2013.01); *B32B 13/04* (2013.01); *B32B 2250/02* (2013.01); *B32B 2419/04* (2013.01)

(58) Field of Classification Search
CPC .......................... B28B 19/0053; B28B 13/023
See application file for complete search history.

(56) References Cited

U.S. PATENT DOCUMENTS

| | | | |
|---|---|---|---|
| 1,539,148 A | 5/1925 | Sylvester |
| 1,643,879 A | 9/1927 | De Meyer |
| 1,885,720 A | 11/1932 | Hewett |
| 2,018,192 A | 10/1935 | Sexton |
| 4,599,841 A | 7/1986 | Haid |
| 4,993,208 A | 2/1991 | Bard et al. |
| 4,995,932 A | 2/1991 | Yoshida |
| 5,051,023 A | 9/1991 | Yoshida et al. |
| 5,281,047 A | 1/1994 | Skaug |
| 5,887,389 A | 3/1999 | Light |
| 7,493,732 B2 | 2/2009 | Brailsford et al. |
| 8,617,308 B1 | 12/2013 | Douglas |
| 8,793,964 B2 | 8/2014 | Brailsford et al. |
| 9,114,664 B2 | 8/2015 | Brailsford et al. |

(Continued)

FOREIGN PATENT DOCUMENTS

| | | |
|---|---|---|
| BE | 852355 A | 7/1977 |
| CA | 2507197 A1 | 11/2006 |

(Continued)

*Primary Examiner* — Jacob T Minskey
*Assistant Examiner* — Virak Nguon
(74) *Attorney, Agent, or Firm* — Gardner, Linn, Burkhart & Ondersma LLP

(57) ABSTRACT

A method and system for manufacturing a tile product includes applying a concrete mixture to a mold, applying an adhesive to a first side of a tile, after the adhesive is applied, facing the first side of the tile toward the concrete mixture in the mold and positioning the first side of the tile on the concrete mixture in the mold and then followed by removing the product from the mold.

23 Claims, 10 Drawing Sheets

(56) References Cited

U.S. PATENT DOCUMENTS

| | | | |
|---|---|---|---|
| 9,340,062 B2 | 5/2016 | Brailsford et al. | |
| 10,737,985 B2 | 8/2020 | Bettonvil et al. | |
| 2005/0089678 A1 | 4/2005 | Mead | |
| 2008/0209831 A1 | 9/2008 | Rinsche | |
| 2009/0049739 A1 | 2/2009 | Newitt et al. | |
| 2009/0049793 A1* | 2/2009 | Newitt | E04F 15/08 52/745.19 |
| 2010/0007051 A1* | 1/2010 | Ness | B28B 13/0295 264/299 |
| 2010/0237158 A1 | 9/2010 | Hou et al. | |
| 2010/0263323 A1 | 10/2010 | Trinidade et al. | |
| 2011/0146200 A1 | 6/2011 | Dang | |
| 2011/0268953 A1 | 11/2011 | Sorger et al. | |
| 2014/0197563 A1 | 7/2014 | Niven | |
| 2014/0342147 A1 | 11/2014 | Hilgenbrink | |
| 2016/0375662 A1* | 12/2016 | Bettonvil | B32B 13/04 428/423.1 |
| 2020/0369575 A1* | 11/2020 | Bettonvil | C04B 28/04 |

FOREIGN PATENT DOCUMENTS

| | | | |
|---|---|---|---|
| CN | 111335108 A * | 6/2020 | |
| DE | 3310281 A | 10/1984 | |
| DE | 4232751 A1 | 5/1994 | |
| DE | 4301118 A | 9/1994 | |
| DE | 29822831 U1 | 3/1999 | |
| DE | 102004015809 A1 | 10/2005 | |
| EP | 0171324 A1 | 2/1986 | |
| EP | 422340 A1 | 4/1991 | |
| EP | 2172330 A1 | 4/2010 | |
| EP | 3216776 A1 * | 9/2017 | B28B 19/0053 |
| EP | 3231784 A1 | 10/2017 | |
| FR | 2385846 A1 | 10/1978 | |
| FR | 2637932 A1 | 4/1990 | |
| FR | 2670223 A1 | 6/1992 | |
| GB | 261114 A | 11/1926 | |
| GB | 316012 A | 7/1929 | |
| GB | 1124642 A | 8/1968 | |
| GB | 2277541 A * | 11/1994 | B28B 19/0053 |
| GB | 2285948 A | 8/1995 | |
| JP | H03159703 A | 7/1991 | |
| JP | H09323310 A | 12/1997 | |
| JP | H10018551 | 1/1998 | |
| JP | H10037441 | 2/1998 | |
| JP | H1136561 A | 2/1999 | |
| JP | 2008223406 A | 9/2008 | |
| KR | 100887939 B1 | 3/2009 | |
| NL | 273944 A | 9/1964 | |
| WO | 9631656 A1 | 10/1996 | |
| WO | 9707303 A1 | 2/1997 | |
| WO | 2022199850 A1 | 9/2022 | |
| WO | WO-2024083765 A1 * | 4/2024 | B25J 11/00 |

* cited by examiner

METHOD FOR MANUFACTURING A TILE PRODUCT

TECHNICAL FIELD AND BACKGROUND

The present disclosure relates to forming a landscaping tile product that looks like a ceramic tile, or another type of tile or tile-like component, but without the attendant issues associated with using tiles in landscaping.

Tile, especially ceramic tile, is relatively brittle and, hence, can easily fracture when not properly supported. More recently, ceramic tiles have been inserted into molds followed by a concrete backing to stabilize and increase the strength of ceramic tile so that it can then be incorporated as a landscaping product without the attendant risks of damage when using tile alone. While this finished product exhibits increased strength and resistance to breaking, in some cases the process may apply too much stress on the ceramic tile so that the ceramic tile breakage in the manufacturing process may exceed desired levels and cause waste in the manufacturing process.

In other applications, the tile may be post applied to a concrete base. While the concrete base may provide support to the tile, alignment of the tile with the concrete base may not be sufficiently precise and delamination may occur.

SUMMARY

The present disclosure relates to a method and system for manufacturing a tile product from a tile and a concrete base.

The method includes filling a mold cavity with a concrete mixture. The method further includes applying an adhesive to a first side of a tile, and after applying the adhesive, facing the first side of the tile toward the concrete mixture in the mold cavity. The tile is then positioned with its first side on the concrete mixture in the mold cavity. Thereafter, the tile and concrete mixture assembly is removed from the mold cavity.

Optionally, pressure and/or vibration may be applied to the concrete mixture (before placing the tile on the concrete mixture) to densify the concrete mixture.

Optionally, pressure and/or vibration may be applied before and/or after the tile is positioned on the concrete mixture.

When pressure is applied before positioning the tile on the concrete mixture, the applied pressure may be much higher than if applied after the tile is placed in the mold. For example, the pressure applied to the concrete mixture when applied before the tile is placed on the concrete mixture may be up to 100 bar. When applied after the positioning the tile on the concrete mixture, the applied pressure may be less than 2 bar.

The pressure and vibration may be applied together or may be applied separately.

In another example, the method may optionally include, after removing the tile and concrete mixture assembly from the mold cavity, placing the tile and concrete mixture assembly curing the tile and concrete mixture assembly, for example in a chamber to form the tile product. Curing may include exposing the tile and concrete mixture assembly to an environment, such as in a chamber, with an increased moisture content and/or temperature over ambient air. For example, the increased moisture content may be in a range of about 10-100% more than ambient air. For example, the increase temperature may be in a range of about 1 degree f to 200 degrees F. greater than ambient air.

In yet a further aspect, the method includes providing a mold cavity having a direction for removing the tile and concrete mixture assembly. The mold cavity includes a plurality of grooves extending in the direction for removing, wherein filling the mold cavity includes filling the grooves with the concrete mixture to form one or more spacers for the tile product.

In another aspect, the method further includes vibrating the concrete mixture for a period of time. For example, the concrete mixture may be vibrated before placing the tile on the concrete mixture for a period of time. In one aspect, the period of time may be at least 0.1 seconds. In other aspects, the period of time may be in a range of about 0.1 seconds to 120 seconds, optionally in a range of about 0.5 seconds to 30 seconds, and optionally in a range of about 0.5 seconds to 4 seconds.

In one example, the concrete mixture may be vibrated after placing the tile on the concrete mixture for a second period of time. For example, the second period of time may be in a range of about 0.1 seconds to 120 seconds, optionally in a range of about 0.5 seconds to 30 seconds, and optionally in a range of about 0.5 seconds to 4 seconds.

In another example, the method may include vibrating and compressing the concrete mixture before and/or after placing the tile on the concrete mixture. Optionally, the method may include vibrating and compressing the tile and concrete mixture after placing the tile on the concrete mixture to form the tile and concrete mixture assembly.

In addition, the settings for vibrating and compressing the concrete mixture before and after placing the tile on the concrete mixture may be different. For example, the pressure applied to the tile and concrete mixture after the tile is placed on the concrete mixture may be less than 2 bar. The pressure applied to the concrete mixture before the tile is placed on the concrete mixture may be up to 100 bar.

The system includes a mold apparatus with an upper mold top and a lower mold base, which includes at least one mold cavity. The system further includes a concrete feedbox, which contains and is configured to dispense a concrete mixture into the mold cavity. The concrete feedbox is moved between the upper mold top and the lower mold base when the mold top and base are separated to dispense the concrete mixture. The system also includes an input conveyor that conveys tiles, which have had adhesive applied thereto, to a staging area where a robot with a robotic arm lifts at least one tile off the conveyor for placement in the mold cavity after the concrete feedbox has dispensed concrete into the mold cavity. The robotic arm is configured to place the tile with its adhesive side facing the concrete mixture in the mold cavity.

After being placed in the mold cavity, the tile and concrete mixture are joined in the mold cavity by the mold apparatus to form a tile and concrete mixture assembly. The tile and concrete mixture assembly is then removed from the lower mold base and then conveyed by a take-away conveyor. The take-away conveyor conveys the tile and concrete mixture assembly to a holding location, optionally an assisted curing location.

In one example, the upper mold top is configured to move toward the lower mold base to apply pressure and/or vibration to the concrete mixture in the mold cavity before the tile is place on the concrete mixture, and optionally apply pressure and/or vibration after the tile is placed on the concrete mixture in the mold cavity.

In another example, the mold cavity in the lower mold base includes a removable plate that receives the concrete mixture and supports the concrete mixture in the mold cavity while the tile is placed on the concrete mixture. To remove the tile and concrete mixture assembly from the mold cavity, the lower mold base is raised relative to the removable plate to allow the removable plate to be used as a carrier while being conveyed to and supported while in the holding location.

In yet another example, the input conveyor includes a clamp assembly to invert the tile so that the adhesive side is facing down and the robotic arm may pick the tile from the clamp assembly after the tile is inverted and then place the tile in the mold cavity with its adhesive side facing the concrete mixture in the mold cavity.

The system further includes one or more controllers to control the various components, such as the conveyors, the mold apparatus, and the robot, which may have an onboard controller that receives instructions from a system controller to ensure proper timing of the tiles being delivered and the robot picking and placing the tile in the mold cavity.

Accordingly, the present disclosure describes a process for producing a tile product that reduces the stress on the tile while still forming a reinforced tile product suitable for use as a landscaping product.

DETAILED DESCRIPTION

Figure 1:
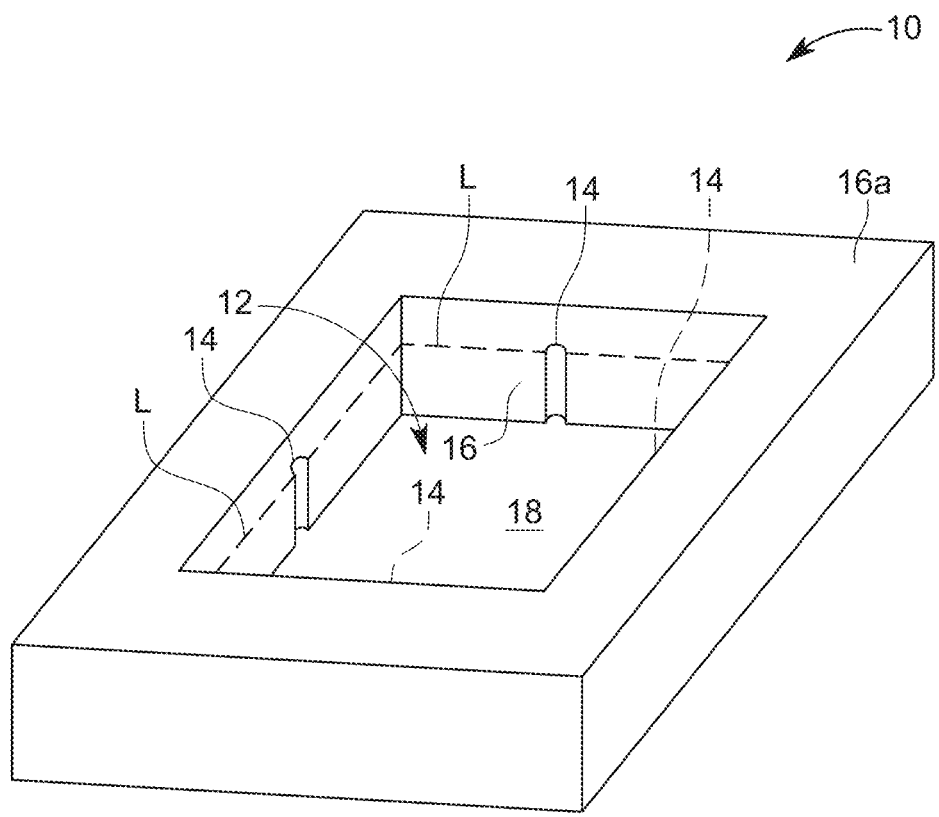
FIG. 1 is a perspective view of a mold base of a molding apparatus for forming a landscaping tile product.

Referring to FIG. 1, the numeral 10 generally designates a mold base of a molding apparatus used to form a tile product from a tile, such as a ceramic or porcelain tile, and a concrete mixture that forms a concrete mixture base. A suitable molding apparatus includes a mold base (often referred to as a "mold frame") with at least one mold cavity and a mold top ("tamper") that optionally applies pressure to the concrete mixture and/or the tile in the mold cavity, as will be more fully described below.

Figure 3:
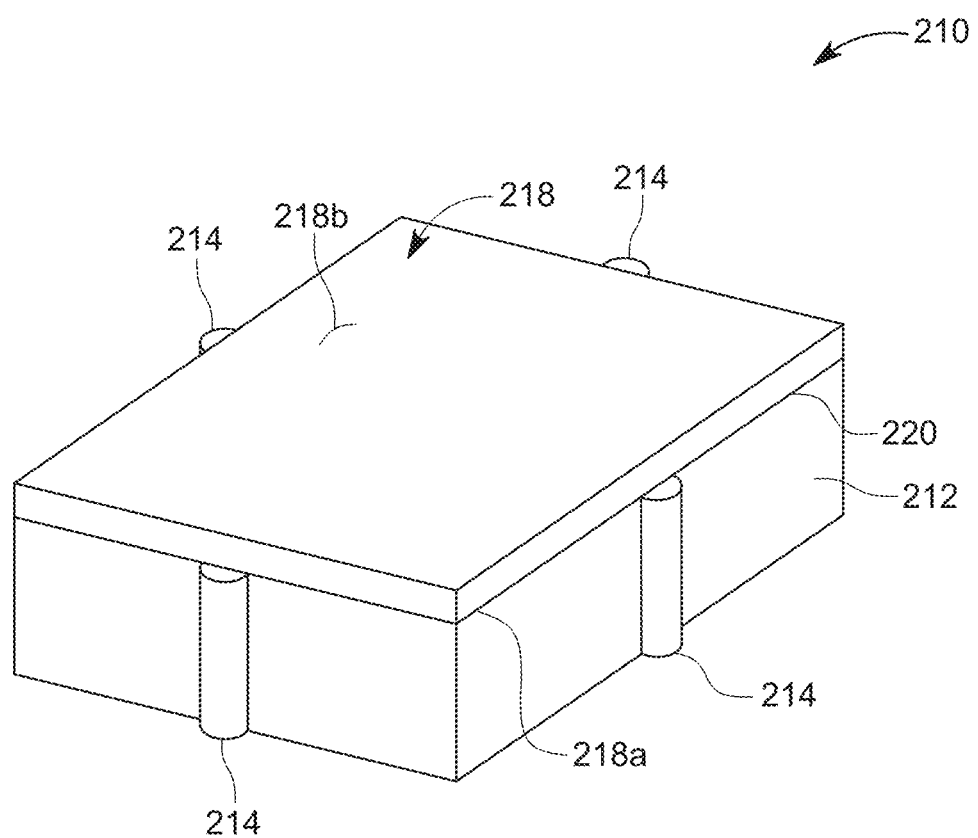
FIG. 3 is a perspective view of a landscaping tile product formed by the mold base and the process of FIGS. 1 and 2.
Figure 4A:
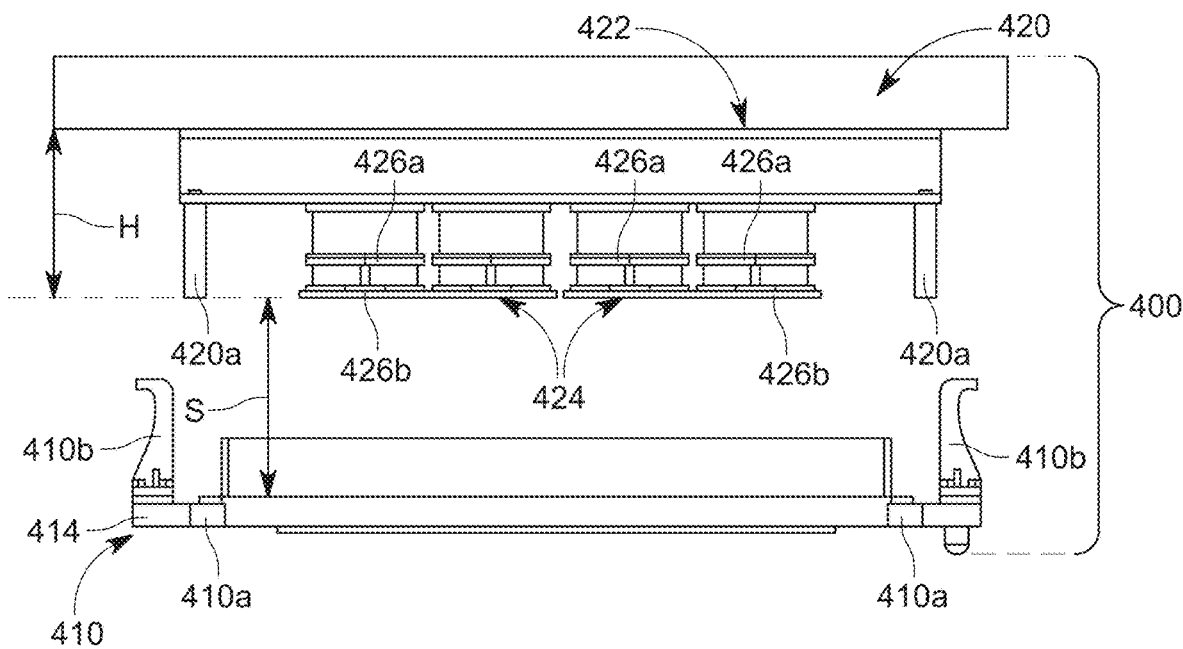
FIG. 4A is a side front elevation (insertion side) of the molding apparatus.

As best seen in FIG. 1, mold base 10 includes mold cavity 12 that is sized and shaped to correspond to the final tile product 210 (FIG. 3). As noted above, the mold top is configured to tamp or compress the concrete material in the mold cavity 12 in the mold base 10, hence is often referred to as "tamper." Further details of a suitable mold top will be described below to FIGS. 4A-4C. The mold cavity 12 is defined by a liner that forms side walls 16. The mold cavity 12 may be sized so that the tile's outer perimeter closely fits inside the mold cavity's inside perimeter such that the tile is closely sealed at the side walls 16 on all edges when placed on the concrete mixture in the mold cavity, described more fully below. This allows for precise alignment between the tile and the base formed by the concrete mixture.

Referring again to FIG. 1, mold cavity 12 may include grooves 14 that are formed in the side walls 16 of mold cavity 12, which define the perimeter of the mold cavity 12. It should be understood that the grooves 14 may be omitted. When provided, grooves 14 allow the concrete mixture that forms the concrete base to form concrete projections, which act as spacers (often referred to as "spacer bars"). These concrete projections on the final tile product can ease placement of the tile product and, further, provide a space between adjacent tile products to receive joint filler, such as grout, sand, including polymeric sand or polymer modified sand, for example. Further, the concrete projections help resist rotation of the tile products, and also may provide frictional interlocking of the tile products, to help stabilize the tile products during installation. In addition, the concrete projections may provide protection between the tile products during handling, such as during packaging and/or shipment.

Optionally, as shown, grooves 14 may extend from the mold cavity's base wall 18 to a level L (FIG. 1) just below the tile (when the tile is placed onto the concrete mixture in the mold cavity) and, hence, just below the upper ends 16a of side walls 16. Alternately, the grooves 14 may terminate below level L and/or before the base wall 18 and, hence, only extend over a portion of the height of concrete mixture base. As will be more fully described below in reference to FIGS. 4A-4D, the base wall 18 may be separable from the mold base to form a carrier (what is often referred to as a "production pallet") to support the tile and concrete mixture assembly while being removed from the molding apparatus and transported for further handling and/or processing.

Figure 5:
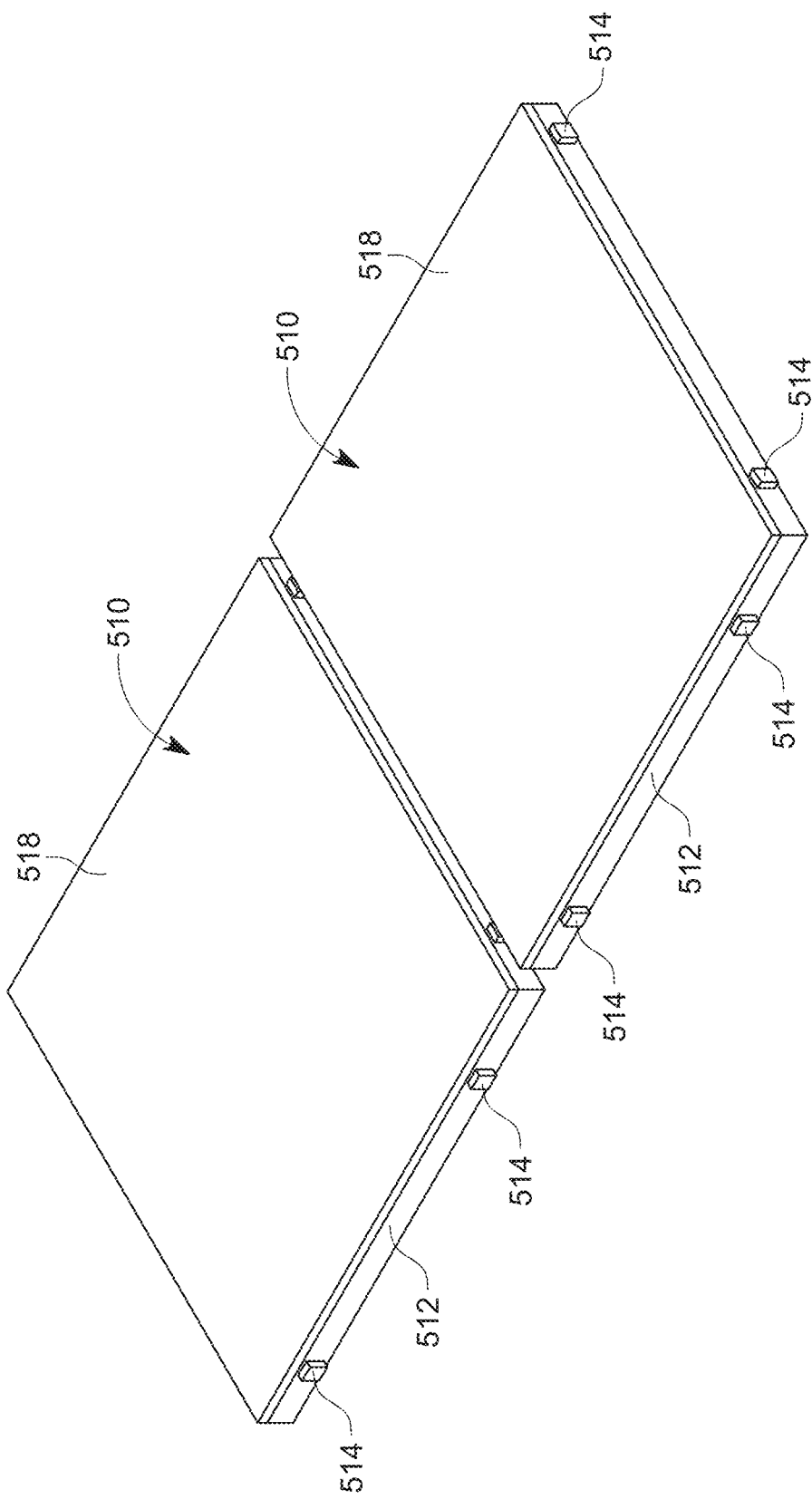
FIG. 5 is a perspective view of another example of two side-by side tile products made using the methods described herein.

The number and shape of the grooves may vary. For example, as shown, one groove per side wall 16 may be provided (FIG. 1) or multiple grooves may be provided per side wall 16 to form multiple spacers on each side of the concrete base (FIG. 5). Further, the grooves 14 may have a uniform cross-section, such as a rounded or arcuate cross-section, a multi-sided cross-section, including a triangular cross-section or a rectangular cross-section. Additionally, the grooves 14 may taper along their lengths. While illustrated as being orthogonal to the base wall 18 of mold cavity 12, the grooves 14 may be angled depending on the type of molding apparatus that is used.

Figure 2:
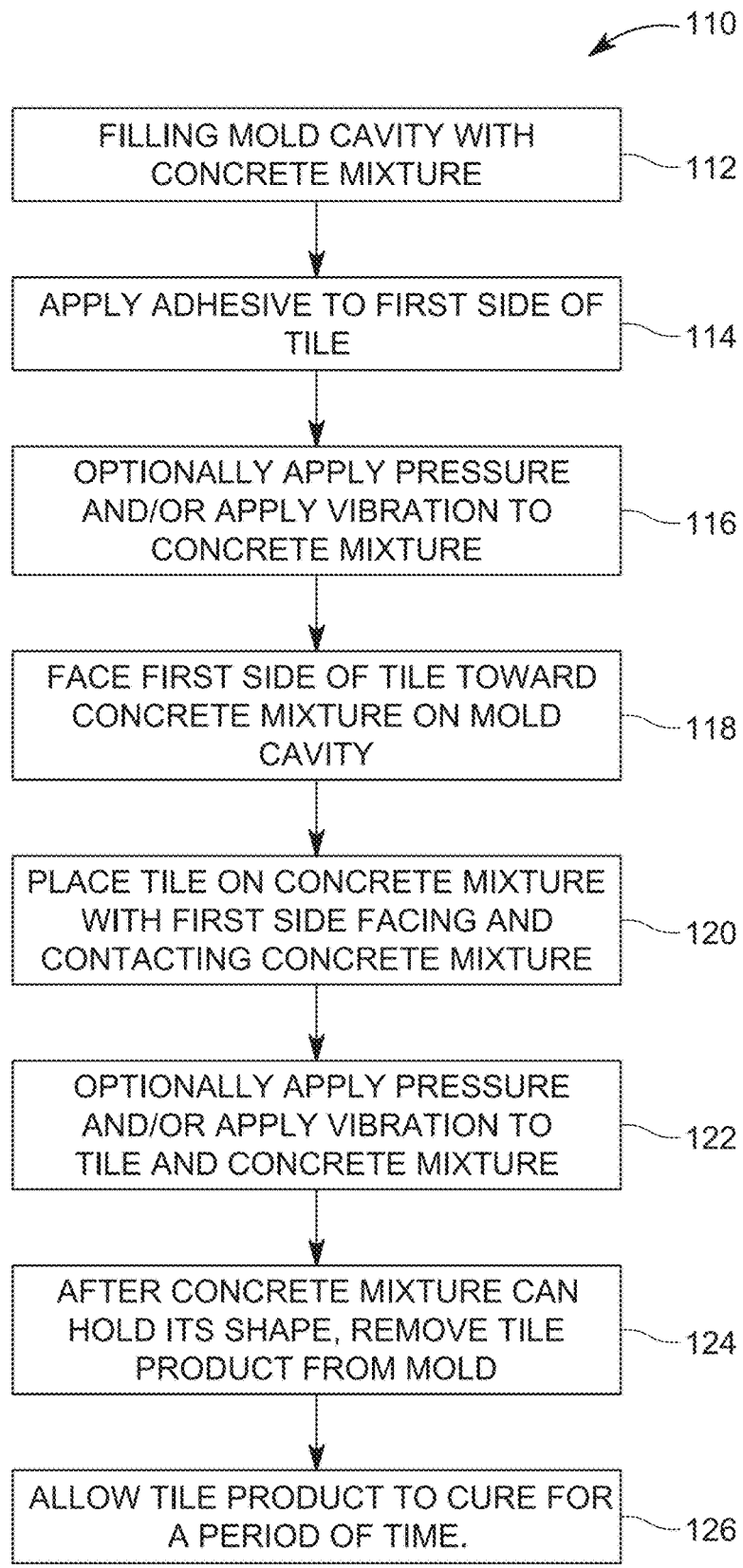
FIG. 2 is a flow chart of the process of forming a landscaping product.

As best seen in FIG. 2, the process (110) to form the tile product 210 (FIG. 3) includes filling (112) the mold cavity 12 with a concrete mixture. The concrete mixture is poured into the mold cavity 12 up to a level (L) (FIG. 1) that is just beneath the top of the mold cavity 12 (upper end of side walls 16) and which is beneath the upper ends 16a of side walls by at least the thickness of the tile. For example, the level L may be in a range of 2-4 mm or about 3 mm below the outwardly facing surface of the tile when the tile is placed on the concrete mixture in the mold cavity. In this manner, the space above the concrete mixture (after being poured into the mold cavity) accommodates the tile 218 so that it is fully contained in the mold cavity 12.

In one example, the concrete mixture is delivered to the mold cavity using a feedbox. The feedbox may be supported by rollers that move the feedbox into position between the mold top and mold bottom (when the molding apparatus is opened). Further, as described in reference to FIGS. 7 and 8 below, ramps may be provided under the rollers that guide the feedbox over the mold to assist with better filling in hard-to-reach areas of the mold cavity. The ramps increase the amount of loose concrete mixture that is available, for example, for the front of the mold cavity. This can be challenging when a large volume of concrete is needed in a mold cavity, for example for larger tile products, such as 6" by 6" (150 mm by 150 mm) tile products or 2 ft by 2 ft (600 mm by 600 mm) tile products or 3.28 ft by 3.28 ft (1 m by 1 m) tile products. In this manner, the final tile product can be manufactured to a very tight height tolerance (for example, between 0.1 mm to 4 mm). For example, the ramps are configured to lift up the feedbox at pre-defined locations over the mold cavity (or cavities as described below) so that the loose concrete mixture does not fill too much at the back of the mold cavity, and instead allows more fill at the very front of the mold cavity, as noted above. In other words, the ramps provide a more even distribution of the concrete mixture in the mold cavity or cavities.

Prior to placing the tile on the concrete mixture, the concrete mixture may be densified. For example, pressure and/or vibration may be applied to the concrete mixture (116) to densify the concrete mixture for a period of time. In one aspect, the period of time may be in a range of 0.1 seconds to 120 seconds, or 0.5 seconds to 30 seconds, or 0.5 seconds to 4 seconds. In addition to densifying the concrete mixture, the vibration and/or pressure also further facilitates the concrete mixture flowing into all of the mold cavity, especially into the grooves noted above. However, the step of densifying may be omitted.

The amount of pressure and/or vibration can vary depending on the flowability of the concrete mixture. Vibration can be achieved via a vibration motor that vibrates the molding apparatus, for example. For example, the pressure can vary from less than 2 bar to about 8 bar, and optionally up to 100 bar.

Prior to placing the tile 218 in the mold 12, an adhesive is applied (114, FIG. 2) to a first side 218a (FIG. 3) of the tile 218 to form an adhesive layer. A suitable adhesive may be in liquid form or paste form and may include a polymer, such as a styrene butadiene or a polyurethane polymer. Optionally to maintain the flowability of the adhesive, the adhesive may be stored in a climate controlled environment, such as a climate controlled chamber, to keep the operating temperature of the adhesive above freezing but below 120 degrees F., or optionally in a range of about 38 degrees F. to 100 degrees F., or optionally in a range of about 70 degrees F. to 90 degrees F., and in some cases above freezing but less than about 80 degrees F.

Optionally, the adhesive layer 220 may be allowed to partially set or partially cure to avoid migration of the adhesive after the tile is placed in the mold cavity. For example, the adhesive layer may be allowed to partially set or partially cure for one or more seconds. After the adhesive is applied (and optionally partially cured), the first side of the tile is faced toward the concrete mixture (118) and the tile 218 is then placed on the concrete mixture (120), with the first side 218a of the tile 218 and adhesive layer 220 contacting the concrete mixture and the decorative side 218b facing outwardly and upwardly from the mold base.

After the tile 218 is placed on the concrete mixture, pressure and/or vibration may be applied (122) to the tile to further densify the concrete mixture. For example, pressure and/or vibration may be applied to the tile and concrete mixture for a second period of time. In one aspect, the second period of time may be in a range of 0.1 seconds to 120 seconds, or 0.5 seconds to 30 seconds, or 0.5 seconds to 4 seconds. For example, the pressure can vary from less than 2 bar to about 8 bar.

In addition, the settings for vibrating and/or compressing the concrete mixture before and after placing the tile on the concrete mixture may be different. For example, as noted, the pressure applied to the concrete mixture before the tile is placed on the concrete mixture may be up to 100 bar, while the pressure applied after the tile is placed may be less than 2 bar. Similarly, the first time period may be less than 4 seconds, and the second time period may be less than 1 second. Further, the vibration and pressure may be applied in separate steps or may be applied together.

By placing the tile on the concrete mixture rather than placing the concrete on the tile, the concrete mixture will less likely cause residue on the decorative tile side of the tile. To further avoid concrete residue on the decorative tile side 218b (side opposite the first side 218a) the method may include the step of removing any excess concrete mixture, such as by brushing and/or applying compressed air to the decorative tile side of the tile before the excess concrete mixture has dried. Therefore, if there is any excess concrete mixture on the decorative side of the tile, it can be removed even before the tile and concrete assembly is removed from the mold cavity.

Once the tile is placed on the concrete mixture in the mold cavity, and pressure and/or vibration is applied to the tile and concrete mixture, the tile and concrete mixture assembly that is now formed may be allowed to at least partially harden or cure (122) in the mold cavity. In one example, the concrete mixture is selected so that it is sufficiently stiff (e.g., low or zero slump concrete) and can hold its shape without needing any additional time to cure, especially after it has been compressed. Once the concrete mixture is sufficiently stiff (either through curing and/or compaction) so that it can hold its shape, the tile and concrete mixture assembly 210 is removed from the mold (124) and then allowed to harden further or at least partially cure (126). Curing can be achieved simply by the passage or time or by assisted curing, as described below, where the natural curing process is accelerated. It should be understood that the term "cure" is used broadly to mean harden to a desired level where it is sufficiently hard for handling and transport and not necessarily to achieve a full cure-which typically takes 28 days for most concrete mixtures.

The concrete mixture as noted may vary. For example, a suitable concrete mixture may comprise a conventional Portland cement, Type I with aggregate, or a fast-drying cement such as "High Early" or Type III cement. A suitable aggregate may include sand, sandstone, granite, granulate, cement and blast furnace slag, ranging from fine to course grade aggregate. Optionally, the concrete may include a combination of two or more aggregates. The size of the aggregate may vary and may include, for example, aggregate particle sizes in a range of about 2 to 8 mm.

In one example, the concrete mixture includes sand in an amount of between 15 and 30%, optionally between 20 and 25%; granulate in an amount of between 55 and 75%, optionally between 62 and 69%; cement in an amount of between about 4 and 30%, optionally between about 12 and 25%, and optionally between about 12 and 18%, with the % calculated is based on % of weight.

Similarly, an aggregate may be added to the adhesive. For example, a suitable aggregate may include fine sandstone or quartz sand. The dimensions of aggregate added to the primer is preferably in the range of up to 1 mm.

Optionally, as understood with reference to the grooves described above, the concrete base formed by the concrete mixture may be dimensioned so that one or more portions of the base protrude at least partly beyond the perimeter of the tile. As described above, this allows for a space to be created between adjacent tiles when adjacent tile products are placed in an abutting relationship to allow grout or mortar or the like to be placed between adjacent tiles. As described above, in some examples, the concrete base is formed with projections that act as spacers, such as "spacer bars," on one, two, three, or all four sides of the final tile product. Further, as described above, the projections may be recessed beneath the tile and may extend from just below flush with the decorative face of the tile for the full height of the concrete base or just a portion of the height of the concrete base. However, the projections alternately may be post applied using an adhesive.

In another example, after removing the tile and concrete mixture assembly from the mold cavity, the method may optionally include applying an assisted curing process. In one example, the assisted curing process includes placing the tile and concrete mixture assembly in a chamber with a controlled environment and curing the tile and concrete mixture assembly in the chamber. For example, the assisted curing may include exposing the tile and concrete mixture assembly to an environment in the chamber with an increased moisture content and/or temperature over ambient air. For example, the increased moisture content may be in a range of about 10-100% more than ambient air. For example, the increase in temperature may be in a range of about 1 degree f to 200 degrees F. greater than ambient air.

According to another method, a tile is brought into contact with a concrete mixture in a mold with an adhesive applied to the side of the tile that faces the concrete mixture prior to contact with the concrete mixture. After the concrete mixture can hold its own shape, the tile and concrete mixture assembly is removed from the mold cavity and the placed in a chamber with an environment with increased humidity and/or temperature over ambient air to cure the tile product. Pressure and/or vibration may be applied to the concrete mixture before and/or after placing the tile in contact with the concrete mixture to densify the concrete mixture.

Referring to FIGS. 4A-4G, in another example, a molding apparatus 400 may include a mold base 410 with one or more mold cavities 412 for forming tile products 210 or 510 (FIGS. 3 and 5). For example, the molding apparatus 400 may comprise a heavy-duty molding apparatus commercially available from a large number of commercial manufacturers though with one or more modifications noted below.

Referring again to FIG. 4A, molding apparatus 400 includes a hardened steel mold top 420 ("tamper") spaced from and movably supported relative to mold base 410 (often referred to as a "mold frame") so that the two mold halves (top and base) can be opened or closed during the tile product forming process. The mold apparatus 400 is opened by moving the mold top 420 or mold base 410 away from the other, for example, on guides using one or more actuators, such as a motor or motors. In the illustrated example, the mold top 420 is supported above mold base 410 and is raised relative to the mold base 410 to open the mold apparatus, as will be more fully described below.

Figure 4B:
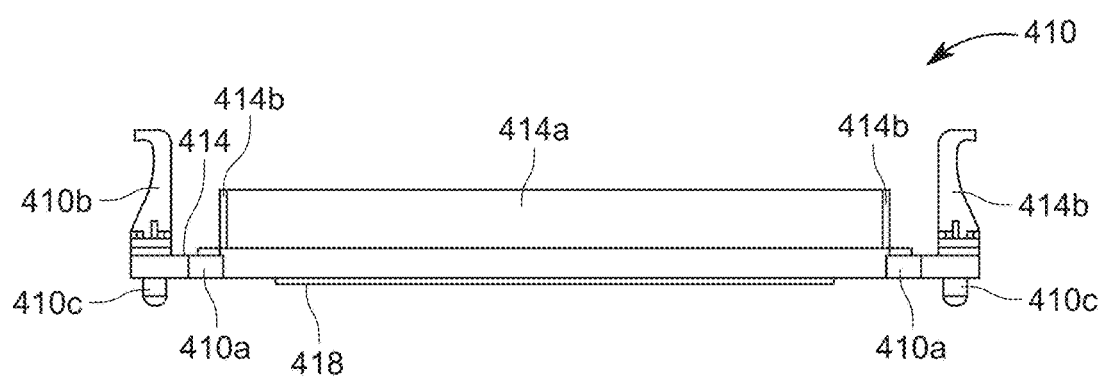
FIG. 4B a side elevation view of the mold base of the molding apparatus.
Figure 4C:
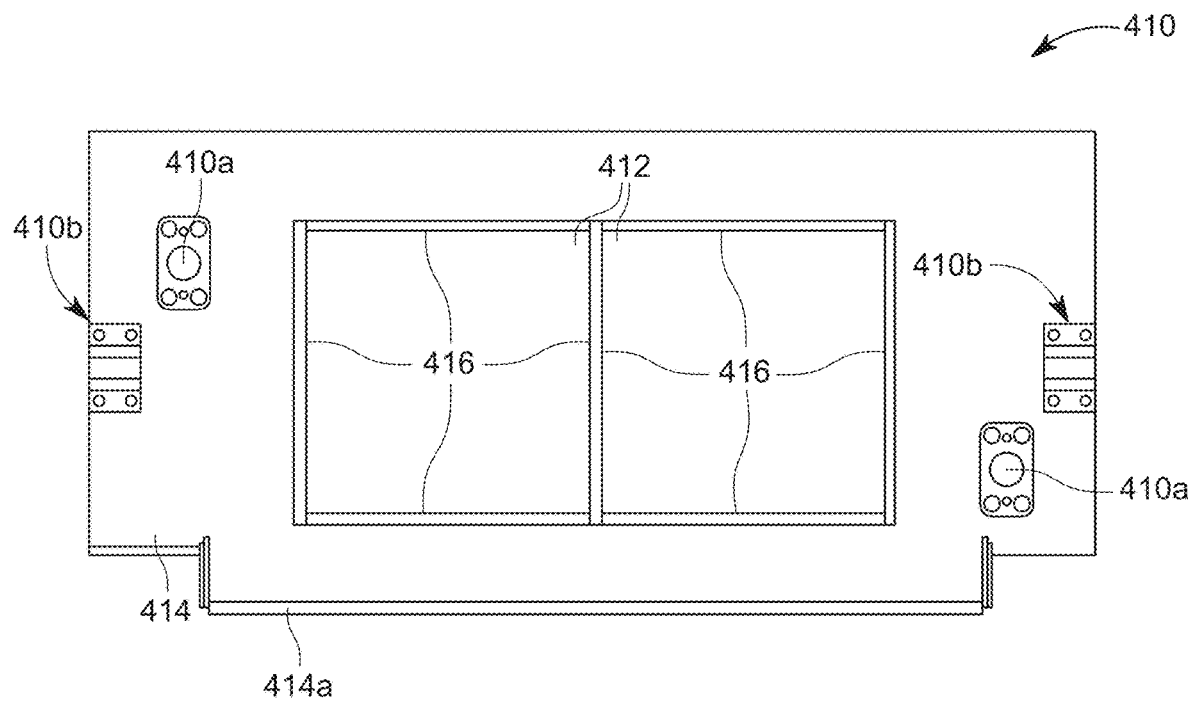
FIG. 4C is a plan view of a portion of the mold base of FIG. 4B.
Figure 4D:
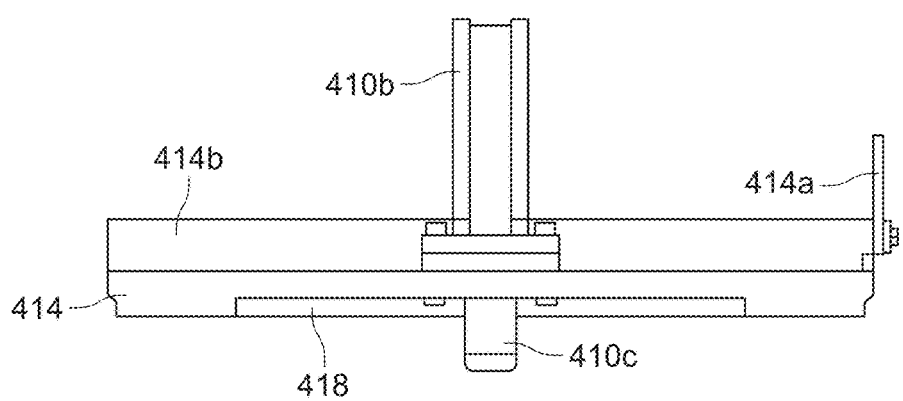
FIG. 4D is an end elevation view of the mold base of FIG. 4B.
Figure 4E:
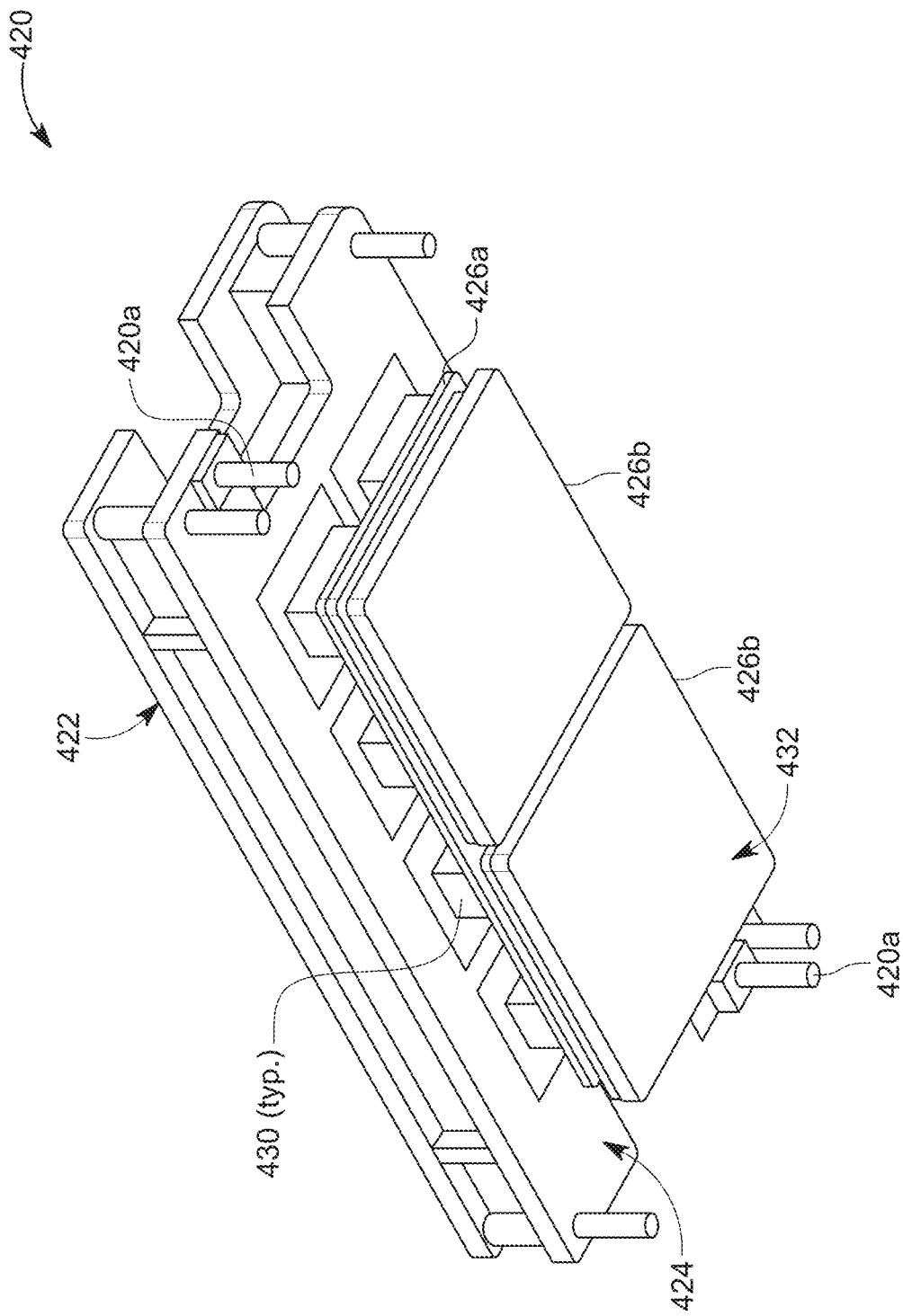
FIG. 4E is a perspective view of a mold top of the molding apparatus of FIG. 4A.
Figure 4F:
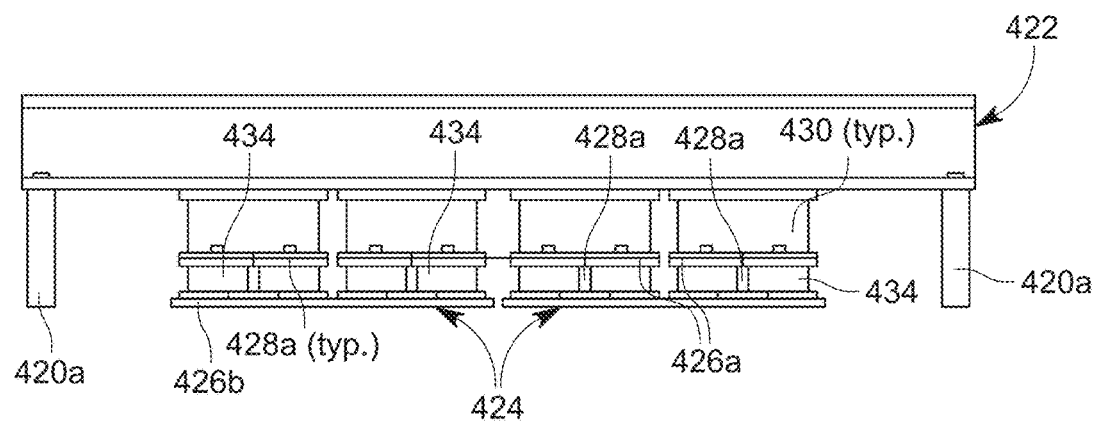
FIG. 4F is a front elevation view of the mold top of FIG. 4E.
Figure 4G:
FIG. 4G is a plan view of the mounting plate assembly of the mold top of FIG. 4E as viewed from the top of the mounting plate assembly that mounts the mold top to the molding apparatus.

Referring to FIGS. 4E-G, in one example, mold top 420 includes a mounting plate assembly 422 that mounts the mold top 420 in the molding apparatus 400 via supports 422a, such as bolts or pins, and is raised or lower relative to mold base 410 by one or more actuators, which are under the control of a mold apparatus-based controller described below.

As best seen in FIGS. 4E and 4F, mounting plate assembly 422 supports a pair of movable steel plate assemblies 424 that correspond in number and size with mold cavities 412 and are used to apply pressure on the concrete mixture and/or tile (when positioned in the mold cavities 412 (FIG. 4F), as described above.

Movable steel plate assemblies 424 include upper and lower spaced apart steel plates 426a, 426b, which are secured together by bolts 428a. Lower plates 426b are often referred to as "shoes" and are moved to selectively contact and apply pressure on the concrete mixture and/or tiles (when positioned in the mold cavities 412 (FIG. 4F)). For example, plate assemblies 424 are supported on columns (often referred to as "plungers") 430 that extend from mounting plate assembly 422 through sockets in the mounting plate assembly 422. Columns 430 are secured on their lower ends to upper plate 426a. As columns 430 are extended from or contracted into mounting plate assembly 422, columns 430 move the plate assemblies 424 toward or away from mold cavities 412 when aligned over the mold base 410, as controlled by the molding apparatus-based controller (described below).

Mold base 410 is movably mounted in the molding apparatus 400 by hooks 410b (FIGS. 4A and 4B) and further is supported on a bearing surface in the molding apparatus by supports 410c. In addition, the mold top 420 and mold base 410 each include respective guide pins 420a (FIG. 4E) and sockets 410a (FIGS. 4A and 4B) to form a tamper positioning system to guide and align mold top 420 onto the mold base 410 when the mold top is lowered by the molding apparatus. The guide pins 420a align with the sockets 410a during compression to ensure that the lower plates 426b (FIGS. 4E and 4F) (commonly referred to as "shoes") are precisely aligned with the mold cavity 412 during each production cycle.

In the illustrated example, the mold top 420 has a lower height profile H (FIG. 4A) than a conventional molding apparatus (which is typically 850 to 900 mm in height) to allow greater access to mold base 410 for equipment, including robotic arms and the concrete feedbox described below, to form and process the tile product. For example, the overall height of the height profile of mold top 420 may be in a range of about 260 mm to 760 mm, optionally about 360 mm to 660 mm, and, optionally and, in one example, optionally about 430 mm. Or stated another way, the height profile of mold top 420 may be configured to provide a spacing S between the bottom of mold top 420 and the top of mold base 410 when opened in a range of about 300 mm to 800 mm, and optionally about 400 mm to 700 mm, and, in one example, optionally about 630 mm.

Optionally to reduce the risk of breakage, the mold top 420 may include molding surfaces (which contact the tile during the molding process) that are configured to reduce the stress on the tile. For example, plates 426b may have areas with or be fully laminated with a rubber coating 432 on at least their surfaces that come into contact with the tile during molding. For example, the rubber coating may be 2-8 mm thick or about 6 mm thick, and formed from highly durable rubber, such as polyurethane elastomer, that will cushion and protect the surface of the tile.

Additionally, as best seen in FIG. 4F, rubber inserts 434, such as rubber bumpers, may be located between the lower plates 426b and upper plates 426a that allows the lower plates to flex when applying pressure to the concrete mixture and/or tile, as described above. The rubber inserts 434 allow the lower plates 426b to articulate slightly relative to plates 426a and apply pressure where it is needed most to create a more even product.

Referring again FIGS. 4B and 4C, mold base 410 includes a base plate 414 to which hooks 410b are mounted and, further, which forms and supports the mold cavities 412. Additionally, base plate 414 may also support upwardly extending walls 414a and 414b to form a fence around the mold cavities. As noted above, one or more mold cavities may be provided. Similar to mold cavity 12, mold cavities 412 are defined by liners that form side walls 416 and, further, by a movable base wall 418 that defines the bottom wall of the mold cavities (commonly referred to as "a production pallet"). For example, base wall 418 may be formed by a base plate that is sized to hold one or more tile and concrete mixture assemblies in a planar side by side arrangement. Base wall 418 is supported on a conveyor section 411 located beneath mold base 410, which is straddled by the bearing surfaces noted above. In this manner, when the tile and concrete mixture assembly is formed in the mold cavity, the mold base 410 may be lifted leaving the base wall 418 still supported on the conveyor section 411 so that the conveyor section 411 can convey the tile and concrete mixture assembly away from the mold apparatus for further processing described below in reference to FIG. 6. Thus, the base wall 418 may support one or more tile and concrete mixture assemblies and, as such, act as a carrier or "production pallet" to support and transport the one or more tile and concrete mixture assemblies to the next step in the manufacturing process.

Referring to FIG. 5, in another example, a tile product 510, which is similar to product 210, includes a tile 518 and concrete mixture base 512. In the illustrated example, tile product 510 includes multiple concrete projections or spacers 514 along each of its sides, which are similarly formed by grooves provided in mold cavities 412. Further, each spacer 514 is rectangular in shape forming a bar-shaped spacer. Again, spacers 514 are recessed below the tile 518 so that are not visible when the tile products are installed and the gaps between them filled with joint filler, as noted above.

In any of the above, the mold cavities may be configured to form channels in the concrete base or between the concrete base and the tile. These channels extend around the perimeter of the tile product and are parallel to the outwardly facing surface of the tile product. These channels help with installation and allow the tile product to be used in a rail-type system, or the like, which engage the tile product via the channels and are, therefore, particularly suitable for decks, including roof decks, and/or installations that require fall through protection.

Figure 6:
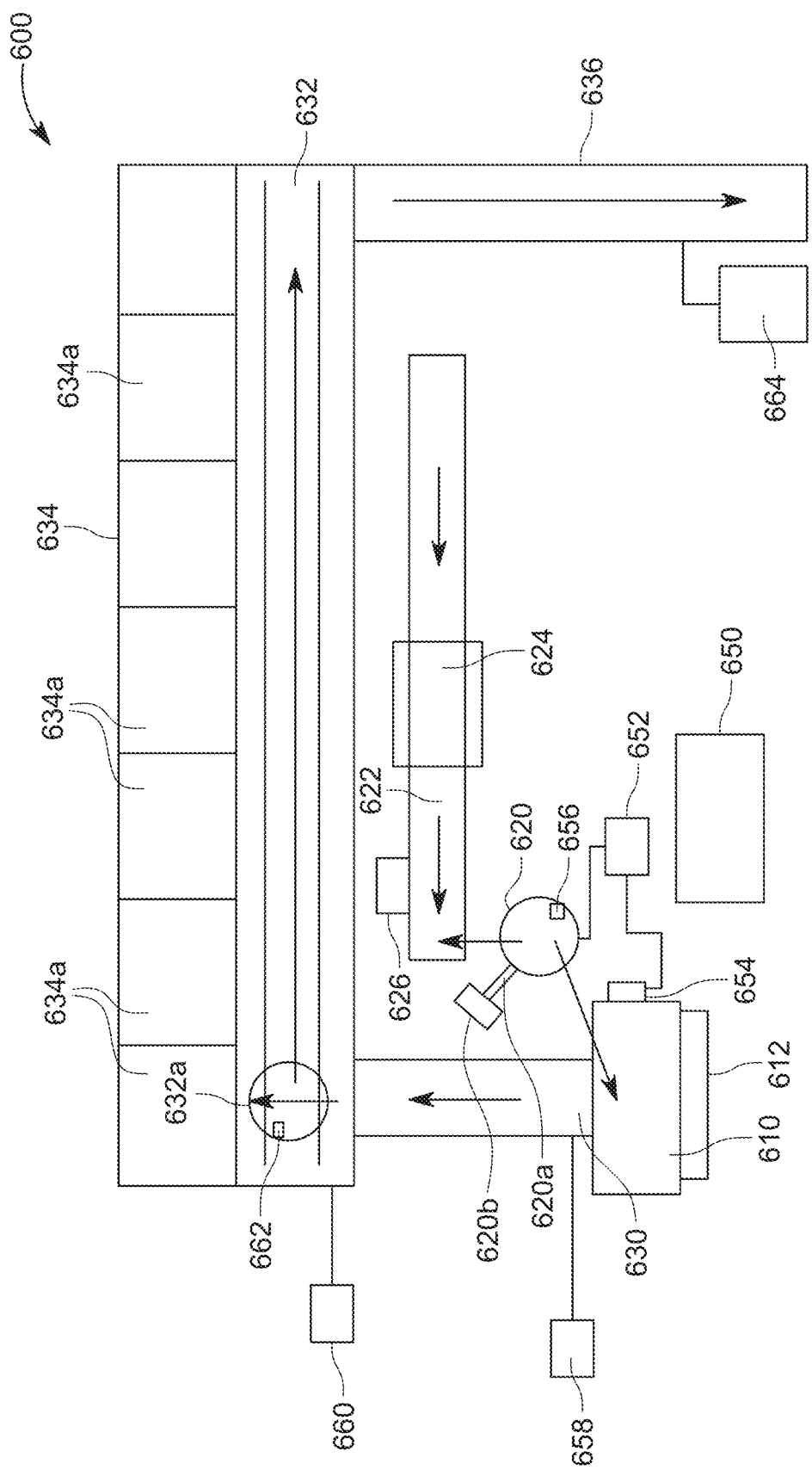
FIG. 6 is a schematic drawing of a system for forming a landscaping tile product using the methods and components described herein.

Referring now to FIG. 6, tile product manufacturing system 600 for forming a tile product, such as tile products 210 and 510, includes a mold apparatus 610. Similar to the above molding apparatuses, molding apparatus 610 includes a lower mold base, which includes at least one mold cavity, and an upper mold top, which may be configured to apply pressure and/or vibration to the concrete mixture and tile once deposited in the mold cavities. For further details of the molding apparatus 610 reference is made to molding apparatus 10 or 400 described above.

Figure 7:
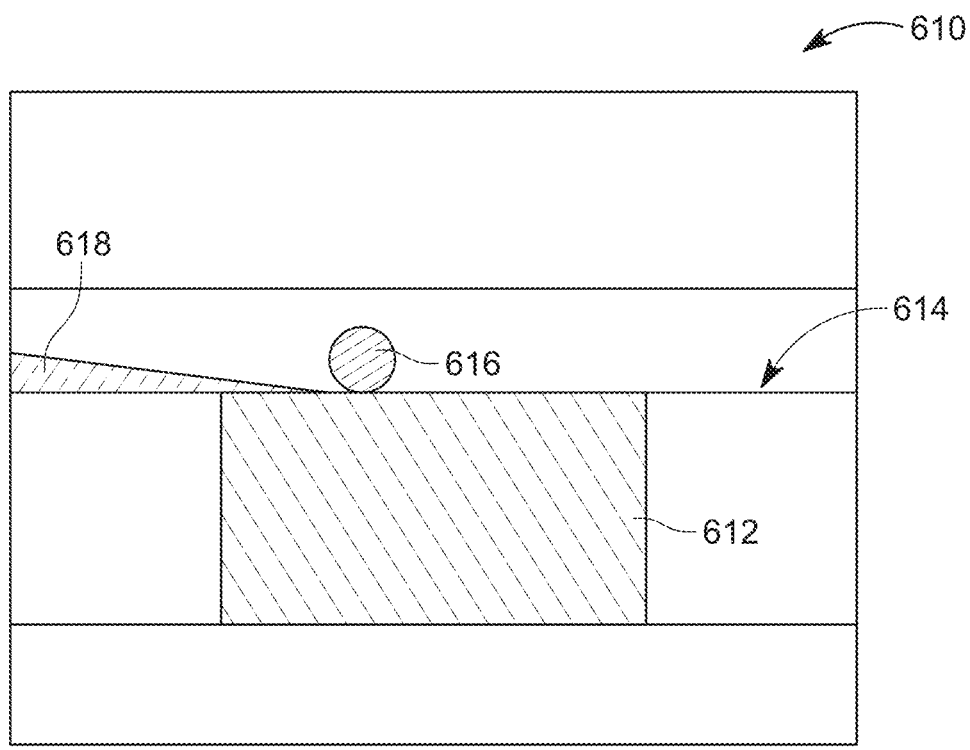
FIG. 7 is a side elevation schematic of optional ramps that may be used in the molding apparatus to guide the feedbox across the mold cavity or mold cavities.
Figure 8:
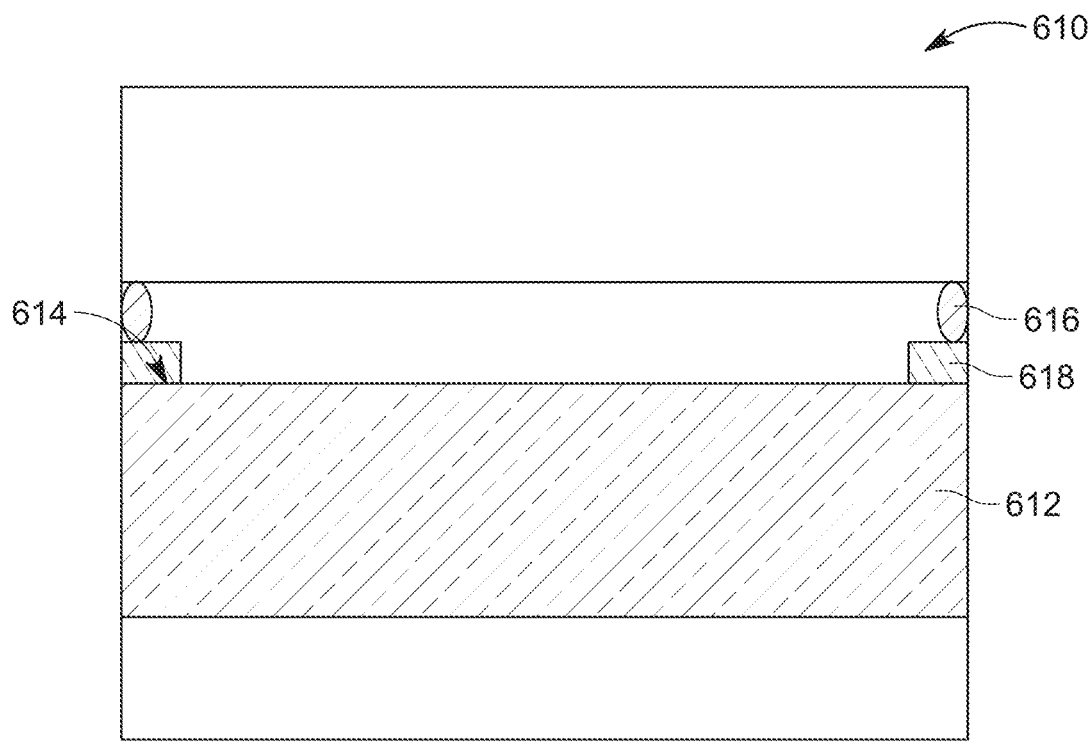
FIG. 8 is a front end elevation schematic of the feedbox and rails in the molding apparatus.

The tile product manufacturing system 600 further includes a concrete feedbox 612, which is supported on rails by bearings, such as rollers, so that the feedbox can be moved along the rails from a non-dispensing position to dispensing positions between the mold top and the mold base (when opened) to deposit a concrete mixture into the cavity or cavities in the mold base (e.g., see FIGS. 7 and 8). For example, the concrete feedbox 612 may be located inside the molding apparatus 610 but outside the footprint of the mold top and the mold base or outside the molding apparatus 610. For further details of the concrete mixture, reference is made to the molding process described above.

In one example, as best seen in FIGS. 7 and 8, the concrete feedbox 612 may be suspended by a pair of rails 614 by bearings 616, such as rollers, with the rails 614 extending into the molding apparatus but outside the footprint of the upper mold top. Rails 614 may include ramps 618, as noted above, or be configured as ramps to raise the feedbox at pre-defined locations over the mold cavity (or cavities as described above) so that the loose concrete mixture does not fill improperly, such as fill too much at the back of the mold cavity, and instead allows more fill at the very front of the mold cavity, as noted above. In other words, the ramps provide a more even distribution of the concrete mixture in the mold cavity.

The tile product manufacturing system 600 also includes a robot 620 with a robotic arm 620a fitted with an end of arm tooling 620b that is configured to clamp onto one or more tiles that is or are conveyed to the staging area from the input conveyor 622. Optionally, the end of arm tooling 620b may be configured to clamp onto two or more side by side tiles when the molding apparatus has two or more mold cavities so that the multiple tiles are picked and placed at the same time into the mold cavities. It should be understood that the tiles may be individually picked and placed in a mold cavity of a multi-mold cavity molding apparatus, but as would be understood this could slow down the manufacturing process.

In addition, tile product manufacturing system 600 includes an adhesive dispensing and applicator system 624, which straddles input conveyor 622. For example, adhesive dispensing and applicator system 624 may include a dispensing apparatus, such as an array of adhesive spray nozzles, and rollers to spread the adhesive and apply the adhesive across the upwardly facing side of each tile while supported on the input conveyor 622.

To invert the orientation of the tile (or tiles) before being picked up by the robot 620 off input conveyor 622, tile product manufacturing system 600 may also include a clamp assembly 626. Clamp assembly 626 is located adjacent input conveyor 622 at the staging area and is configured to clamp onto the edges of one or more tiles so that the tile (tiles) can be inverted so that the adhesive side (sides) is (are) facing down after they are inverted. In this manner, the robotic arm 620 may pick the tile (or tiles) from the clamp assembly 626 after the tile is inverted and then place the inverted tile (or tiles) in the mold cavity with its adhesive side facing the concrete mixture in the mold cavity.

After robot 620 has picked and placed the tile (or tiles) in the mold cavity (or cavities), and the robotic arm 620a is removed from between the upper and lower mold halves (mold top and mold base), the robotic arm 620a is returned to a home position, while the next tile or tiles is delivered by the input conveyor 622 to the staging area. After clamp assembly 626 has inverted the next tile or tiles, the robot 620 moves its robotic arm 620a to its picking position over the clamping assembly 626 to clamp onto and pick up the next tile (or next set of tiles) from clamp assembly 626 for placement in the mold cavities of the molding apparatus 610.

As described above, molding apparatus 610 may include a base wall, commonly referred to as "production pallet," which is supported on a conveyor section (similar to conveyor section 411) that extends beneath the lower mold base. After the tile and concrete mixture have been formed and then processed in the mold cavity (e.g., pressure and/or vibration applied) to form the tile and concrete mixture assembly (or assemblies), the lower mold base is raised leaving the base wall and the tile and concrete mixture assembly (or assemblies), which are supported on the conveyor section, which conveys tile and concrete mixture assembly (or assemblies) to takeaway conveyor 630. For further details of the tile and concrete mixture assembly molding process, reference is made to the molding process described above.

The takeaway conveyor 630 then conveys the tile and concrete mixture assembly (or assemblies) from the molding apparatus 610 to a second conveyor 632. The second conveyor 632 supports and transfers the tile and concrete mixture assembly (or assemblies) to a holding location 634 where the tile and concrete mixture assembly (or assemblies) can harden. Optionally, the tile and concrete mixture assembly may be held in a holding location 634 where the concrete base hardens under ambient conditions. Alternatively, holding location 634 may include one or more curing chambers 634a with a controlled environment, as described above.

For example, holding location 634 may extend adjacent second conveyor 632 and include a plurality of racks each with a plurality of vertically spaced shelves for supporting a plurality of tile and concrete mixture assemblies. In one example, the second conveyor 632 includes a transfer car 632a that is operable to place and retrieve one or more tile and concrete mixture assemblies on and from the shelves of each rack where the tile and concrete mixture assemblies can sit while the concrete mixture hardens or is "assist cured" as noted above. For further details of the optional assisted curing steps, reference is made to the assisted curing process described above.

To place and retrieve the tile and concrete mixture assemblies, the transfer car 632a may include a pair of arms that are configured to place or retrieve the one or more tile and concrete mixture assemblies on or from the shelves of a rack. Further, the transfer car 632a may include a plurality of vertically arranged arms that are configured to move vertically and place or retrieve a stack of the tile and concrete mixture assemblies on or from the vertically arranged shelve at the same time.

Additionally, the transfer car 632a may be supported on a turntable on the second conveyor 632 so it can rotate between a first orientation with its arms facing the first take away conveyor 630 to receive incoming tile and concrete mixture assemblies and a second orientation with its arms adjacent and facing one of the racks in the holding location 634 to place or retrieve the tile and concrete mixture assemblies. The transfer car 632a is further configured to move along the second conveyor 632 to align with a respective rack in the holding location 634 so that stacks of tile and concrete mixture assemblies can be placed and then retrieved after the respective tile and concrete mixture assemblies have sufficiently hardened or cured for further handling as described below.

After the tile and concrete mixture assemblies have sufficiently hardened to form the tile products and have been retrieved by the transfer car 632a, the transfer car 632a is then conveyed by the second conveyor 632 to a third conveyor 636. which forms a packaging line and receives the stack from the transfer car 632a after the transfer car 632a has been reoriented to its first orientation so that the third conveyor 636 may convey the stack of tile products while packaging the stack of tile products.

Once the tile and concrete mixture assembly or assemblies are removed from the mold cavity (or cavities), and prior to placing the next tile (or tiles), a new base wall is moved under the mold base and the feedbox is moved across the mold cavity or cavities to dispense a preselected amount of concrete mixture into the mold cavity or cavities and onto the new base wall. As noted above, optionally the concrete mixture may be vibrated and/or compressed by the mold apparatus to prepare the concrete base for the tile or tiles. Once vibrated and/or compressed, the mold top is raised and the robotic arm 620a moves from its picking position to its placing position in between the two mold halves to deposit the next tile or next set of tiles on the concrete mixture in the mold cavity or cavities.

In order to control the molding system components, molding system may include one or more controllers. The controllers may each comprise one or more microcontrollers, field programmable gate arrays, systems on a chip, discrete circuitry, memory, and/or other suitable hardware, software, or firmware that is capable of carrying out the functions described. One or more of the controllers may be configured as a programmable logic controller (PLC) of the system.

In one example, the controllers include a system or master controller 650 that controls the operation of the conveyors, the robot, and the mold apparatus either directly or through sub-controllers and/or local controllers. System controller 650 may also control components associated with the conveyors, such as the clamping assembly 626, the adhesive dispensing and applicator system 624, and the packaging system as well as the operation of the optional curing chambers 634a, again either directly or through sub-controllers or local controllers.

For example, system 600 may have a sub-controller 652 that controls the molding apparatus 610 (e.g., to control the movement of upper and lower mold halves (mold top and mold base)) via a local mold-based controller 654, controls robot 620 (to control movement the robot itself and of its robotic arm 620a, as well as the end of arm tool 620b) via a local robot-based controller 656. Sub-controller 652 may also control input conveyor 622, adhesive dispensing and applicator system 624, and clamping assembly 626 based on input from system controller 650.

In addition to controlling movement of the upper and lower mold halves, local mold-based controller 654 may control the conveyor beneath the mold base and the movement and dispensing of the concrete mixture from the feedbox, based on input from system controller 650.

Sub-controller 652 may be configured to sequence the robot and its robotic arm movement with the clamping assembly as well as the molding apparatus to avoid collisions between any of the respective components.

Further, take away conveyor 630 may include a local conveyor controller 658, which is in communication with and controlled by system controller 650. Similarly, second conveyor 632 and transfer car 632a may each have a respective local controller 660 and 662, which are in communication with and controlled by system controller 650 to achieve the functionality and sequencing described herein. In addition, conveyor 636 may have a local controller 664, which is also in communication with system controller 650 and which controls the flow of tile product along conveyor 636.

System controller 650 and/or sub-controller 652 may be configured to coordinate and sequence the movement of the conveyors 622 and 630, clamping assembly 626, and robot 620 to ensure the tile or tiles are conveyed to the staging area at the appropriate times for being inverted by the clamp assembly. The sequencing may include conveying the tile or tiles with a first speed and then halting the input conveyor when the tile or tiles are at the staging area until the tile or tiles are inverted by the clamping assembly. Once the first tile or first set of tiles are lifted off the input conveyor the input conveyor 622 may then again be operated to convey the next tile or set of tiles to the staging area. This pause is sufficient to allow the clamping assembly to clamp onto and then invert the tile or tiles ready for pick up by the robot 620.

In one example, input conveyor 622 includes two or more conveyor sections, with each conveyor section controlled by system controller 650 (either directly or via sub-controller 652) so that each tile may be conveyed to the staging area independently.

The conveyors described herein may comprise conventional motorized conveyors, including conventional belt conveyors with two or more discrete spaced belts for supporting the tile without damaging the tile or conventional motorized chain conveyors with two or more spaced chains suitable when supporting the base walls and which do not directly make contact with the tiles.

Accordingly, the method and system described herein of forming a monolithic tile product from a tile and concrete mixture includes filling a mold cavity with a concrete mixture and placing a tile on the concrete mixture, which tile has an adhesive applied to its side that faces the concrete mixture. Pressure and/or vibration may be applied to the concrete mixture before and/or after placing the tile on the concrete to densify the concrete mixture. Because the concrete can be at least partially densified before the tile is applied to the concrete mixture, the method reduces the risk of cracking the tile. Further, because the tile is placed into the mold cavity at the top of the mold cavity, the tile has very little distance to travel within the mold—for example, the tile's travel distance is about the thickness of the tile. This too helps reduce the risk of cracking the tile.

As would be understood from the description of the above process, the present method of forming the tile product allow for tile inspection immediately after production (even before it is removed from the mold cavity) to allow for quality control rejections, if necessary. Further, as noted, in one example, due to the concrete mixture being placed in the mold first, at least some of the densifying (or compaction) can be achieved before placing the tile on the concrete mixture. Hence the amount of pressure on the tile may be reduced, which can greatly reduce the risk of cracking the tile. The risk of cracking the tile may further be reduced using the rubber coated "shoes."

While several forms of the method have been described herein, it should be understood that any of the method steps described in one example can be combined with one or more steps from the other method. Further, while described in the context of a ceramic tile, other tiles or tile like elements may be used. For example, porcelain tiles or other decorative tiles or tile-like elements may be used, including man-made tiles, natural stone tiles, clay tiles, or brick, and also non-decorative tiles, for example, that form wear layers. For the purposes of this application "tiles" shall include tiles and tile-like elements.

We claim:

1. A method for manufacturing a landscaping tile product in a molding apparatus, the molding apparatus having a mold cavity, said method comprising the steps of:
   filling the mold cavity with a low or zero slump concrete mixture;
   providing a tile with a first side and a second side opposed from the first side, the second side forming a decorative side of the tile;
   providing an adhesive to improve adhesion between the first side of the tile and the low or zero slump concrete mixture;
   positioning the tile on and in contact with the low or zero slump concrete mixture in the mold cavity with the first side of the tile facing and contacting the low or zero slump concrete mixture;
   applying pressure and/or vibration to the low or zero slump concrete mixture to densify the concrete mixture;
   after the concrete mixture can hold its own shape, removing the tile and concrete mixture assembly from the mold cavity; and
   allowing the concrete mixture to harden to obtain the landscaping tile product.

2. The method according to claim 1, wherein said allowing the concrete mixture to harden includes exposing the tile and concrete mixture assembly to an environment with increased moisture and/or temperature other than ambient air.

3. The method according to claim 1, further comprising providing a mold cavity having a direction of removing the tile and concrete mixture assembly, the mold cavity further including a plurality of grooves extending in the direction of removing, wherein filling the mold cavity includes filling the grooves with the concrete mixture to form one or more spacers on the tile product.

4. The method according to claim 1, wherein said applying pressure and/or vibration includes applying pressure and/or vibration before positioning the tile on the concrete mixture.

5. The method according to claim 4, wherein said applying pressure and/or vibration further includes applying pressure to the tile after positioning the tile on the concrete mixture with an applied pressure of less than 2 bar.

6. The method according to claim 5, wherein said applying pressure and/or vibration includes applying pressure at a first pressure before positioning the tile on the concrete mixture, and applying pressure on the tile at a second pressure less than said first pressure.

7. The method according to claim 4, wherein said applying pressure and/or vibration includes applying vibration to the molding apparatus after positioning the tile on the concrete mixture.

8. The method according to claim 7, wherein said applying vibration to the molding apparatus further includes applying vibration to the molding apparatus for a period of time in a range of 0.5 seconds to 4 seconds.

9. The method according to claim 4, wherein said applying pressure and/or vibration includes applying vibration to the molding apparatus before positioning the tile on the concrete mixture for a first period of time and applying vibration to the molding apparatus after positioning the tile on the concrete mixture for a second period of time less than first period of time.

10. The method according to claim 1, wherein said providing a tile comprises providing a ceramic tile or a porcelain tile or natural stone tile.

11. The method according to claim 1, wherein said providing an adhesive includes applying the adhesive to the first side of the tile before placing the tile in the mold cavity.

12. The method according to claim 1, further comprising exposing the tile and concrete mixture assembly to an environment with increased moisture and/or temperature other than ambient air to form the landscaping tile product.

13. A method for manufacturing a landscaping tile product in a molding apparatus, the molding apparatus having a mold cavity, said method comprising the steps of:
   providing a tile with a first side and a second side opposed from the first side, the second side forming a decorative side of the tile;
   providing a low or zero slump concrete mixture;
   at least partially filling the mold cavity with the low or zero slump concrete mixture;
   providing an adhesive to improve adhesion between first side of the tile and the concrete mixture;
   positioning the tile on the low or zero slump concrete mixture in the mold cavity with the first side of the tile facing and contacting the low or zero slump concrete mixture to form a tile and concrete mixture assembly; and
   after the concrete mixture can hold its own shape, removing the tile and concrete mixture assembly from the mold cavity.

14. The method according to claim 13, further comprising applying vibration to the mold apparatus to densify the low or zero slump concrete mixture.

15. The method according to claim 14, wherein said applying vibration includes applying vibration to the mold apparatus before and after positioning the tile on the low or zero slump concrete mixture in the mold cavity.

16. A system for manufacturing a landscaping tile product, the landscaping tile product having a tile and a concrete base, said system comprising:
   a molding apparatus including a mold cavity;
   a concrete feedbox to dispense a low or zero slump concrete mixture into said mold cavity, said concrete feed box being movable across said mold cavity to distribute the low or zero slump concrete mixture across said mold cavity;
   a robot with a robotic arm to pick and place a tile in said mold cavity to contact the tile with the concrete mixture after the zero or low slump concrete mixture has been dispensed and distributed into said mold cavity to form a tile and concrete mixture assembly; and
   a takeaway conveyor to convey the tile and concrete mixture assembly from said molding apparatus after the tile and concrete mixture assembly has been removed from said molding apparatus.

17. The system according to claim 16, further comprising a control system, said control system including at least one molding apparatus controller to control said molding apparatus and configured to apply pressure to the concrete mixture in said mold cavity prior to placement of the tile on the concrete mixture in said mold cavity.

18. The system according to claim 17, wherein said controller is configured to control said molding apparatus to apply pressure to the tile and concrete mixture in said mold cavity at a lower pressure than applied to the concrete mixture before the tile is placed on the concrete mixture in said mold cavity and to apply vibration to said mold apparatus after the tile is placed on the concrete mixture in said mold cavity.

19. The system according to claim 18, further comprising an input conveyor to deliver tile to a staging area, said control system further including a system controller in communication with said input conveyor, said molding apparatus controller, and said robot to control timing of the tile being delivered to said staging area and said robot picking and placing a tile in said molding apparatus.

20. The system according to claim 16, further comprising a curing chamber to cure the tile and concrete mixture assembly with an environment having a greater temperature and moisture content that the ambient air outside said curing chamber.

21. The system according to claim 16, further comprising an adhesive dispensing and applicator system to dispense and provide an adhesive to the tile before placement on the concrete mixture in said mold cavity.

22. A method for manufacturing a landscaping tile product in a molding apparatus, the molding apparatus having a mold cavity, said method comprising the steps of:
   providing a tile with a first side and a second side opposed from the first side, the second side forming a decorative side of the tile;
   providing a low or zero slump concrete mixture;
   at least partially filling the mold cavity with the low or zero slump concrete mixture;
   applying (1) pressure to the low or zero slump concrete mixture at a first pressure and (2) vibration to the low or zero slump concrete mixture for a first period of time;
   after the step of applying (1) pressure and (2) vibration, positioning the tile on the low or zero slump concrete mixture in the mold cavity with the first side of the tile facing the concrete mixture to form a tile and concrete mixture assembly;
   applying (1) pressure to the tile at a second pressure less than said first pressure and (2) vibration to the molding apparatus after the tile is positioned on the concrete mixture while applying the pressure to the tile for a second period of time less than said first period of time; and
   after the concrete mixture can hold its own shape, removing the tile and concrete mixture assembly from the mold cavity.

23. A method for manufacturing a landscaping tile product from a tile and a concrete mixture base, in a molding apparatus using a robotic arm, the molding apparatus having a mold top and a mold base with a mold cavity, the molding apparatus configured to apply vibration to the concrete mixture and the tile and concrete mixture when in the mold cavity, and the mold top forming a mold press configured to apply pressure to the concrete mixture when placed in the mold cavity and to the tile when placed on the concrete mixture, and the robotic arm operable to place a tile on the concrete mixture when in the mold cavity, said method comprising the steps of:
   filling the mold cavity of the mold base with a low or zero slump concrete mixture;
   after said filling, applying pressure to the low or zero slump concrete mixture to a first pressure with the mold top to densify the low or zero slump concrete mixture and applying vibration to the low or zero slump concrete mixture for a first period of time;
   providing a tile with a first side and a second side opposed from the first side, the second side forming a decorative side of the tile;
   applying an adhesive to the first side of the tile to improve adhesion between the first side of the tile and the concrete mixture;

after said applying pressure to the low or zero slump concrete mixture and vibration to the low or zero slump concrete mixture, raising the mold top and positioning the tile on the low or zero slump concrete mixture with the robotic arm wherein the first side of the tile contacts the low or zero slump concrete mixture to form a tile and concrete mixture assembly;

removing the robotic arm from between the mold top and the mold base and simultaneously applying pressure to the tile and applying vibration to the mold apparatus after the tile has been placed in the mold cavity on the low or zero slump concrete mixture;

removing the tile and concrete mixture assembly from the mold cavity; and after removing the tile and concrete mixture assembly from the mold cavity, allowing the concrete mixture to harden to obtain the landscaping tile product.

\* \* \* \* \*